United States Patent Office

3,464,825
Patented Sept. 2, 1969

3,464,825
KERATIN PROTEIN PRODUCT AND PROCESS OF
PREPARING SAME
Charles A. Anker, Minneapolis, Minn., assignor to General Mills, Inc., a corporation of Delaware
No Drawing. Filed Feb. 28, 1967, Ser. No. 619,194
Int. Cl. A23j 1/10
U.S. Cl. 99—18                                           12 Claims

ABSTRACT OF THE DISCLOSURE

Keratin protein prepared by extracting natural sources, such as feathers, using an aqueous solution of an alkali metal sulfide and subsequent acid precipitation is dispersed using aqueous solutions of alkali metal hydroxides and then the pH is reduced to near the neutral point by the addition of a water soluble oxidizing agent such as hydrogen peroxide.

---

The present invention relates to an improved keratin protein product and the process of preparing same. More particularly, it relates to such a product and process wherein alkali metal sulfide extracted and precipitated keratin protein is dispersed in an aqueous medium containing an alkali metal hydroxide and then the pH is reduced to near the neutral point with a water soluble oxidizing agent which is preferably hydrogen peroxide.

It is known that keratin protein can be isolated from naturally occurring source material such as feathers, hair and the like. One economically feasible process for carrying out the isolation procedure involves the use of aqueous alkali metal sulfide extracting solutions with subsequent acid precipitation of the extracted protein. While the resulting product has value, it is not soluble to any appreciable extent in water. Thus the use of the protein as a constituent of foods is quite limited since many of the same require water dispersibility at or near a neutral pH. The protein can be solubilized in solutions of alkali metal hydroxides. However, such solutions or colloidal dispersions have a pH in the neighborhood of 8.5 and higher. The pH of such solutions can be reduced by the addition of aqueous solutions of acid. However, when reasonably strong acid solutions are used, i.e. 0.5 N and higher, localized precipitation of the protein results and such precipitated protein is not readily redispersed or solubilized unless alkali metal hydroxide is added to again raise the pH of the solution. The pH of the solutions can be lowered with very dilute solutions of acid. However, large quantities of said dilute solutions are required and thus the protein concentration in the solution is lowered considerably. The cost of drying said neutral solutions to produce a dry, neutral product is thus drastically increased making this procedure economically unattractive.

It is an object of the present invention to provide a novel keratin protein product. A further object of the invention is to provide a novel process for preparing such a keratin protein product. These and other objects will become apparent from the following detailed description.

I have now discovered that alkali metal sulfide extracted and precipitated keratin protein can be solubilized in an aqueous solution of an alkali metal hydroxide and the resulting solution can be treated with a water soluble oxidizing agent to yield a substantially neutral, water soluble keratin protein product of extended utility. The action of the oxidizing agent is not completely understood. Only small amounts of the same are required to reduce the pH of the protein solution to the desired degree and such lowering of the pH is completed without causing any significant precipitation of the protein.

It is believed that the oxidizing agent oxidizes the cystine and/or cysteine contained in the isolated keratin protein to cysteic acid which compound then reacts with the alkali metal hydroxide to reduce the pH of the solution without causing any significant precipitation of the keratin protein. The thus prepared solutions of the product can be whipped to provide relatively stable foam structures. Such foams can be used as the supporting structures of various foods—i.e. icings and the like. Of course, the solutions can be dried and the resulting dried product is resolubilized by merely being added to water. It is to be understood that the solutions of the protein may in fact be colloidal dispersions and the latter are intended to be included in the terms "solution" or "solutions."

The starting keratin protein can be that obtained from any naturally occurring keratin source material such as feathers, hair, hoofs, nails, horns and the like. Particularly valuable source materials are feathers—i.e. chicken, turkey and the like feathers which are readily available from poultry processing plants.

The keratin protein is isolated from the source material in the conventional manner. Thus the keratin source material is extracted with an aqueous solution of an alkali metal sulfide and the protein is precipitated from the resulting solution by the addition of an acid. Representative sulfides are sodium sulfide and potassium sulfide. The keratin source material can be in sub-divided form to promote and facilitate the extraction. The extraction is preferably carried out at temperatures of about 20 to 50° C. The alkali metal sulfide is preferably used in an amount of about 2.5 to 20% by weight of the material being extracted. It is also preferred to use relative dilute solutions of the alkali metal sulfide. In this way the extracted keratin protein is more readily dissolved in the extracting medium. Thus, the aqueous solutions preferably contain from about 0.25 to 2% by weight of the alkali metal sulfide and enough of the solution is used so that the concentration of the extracted keratin protein therein remains below about 15% by weight, and is preferably in the range of 1 to 10% by weight sodium sulfide ($Na_2S$) is the preferred extractant.

The protein containing solution is separated from the insoluble residue by conventional means—i.e. decantation, filtration or the like. The insoluble residue can be further extracted or washed with water or fresh aqueous sulfide solution and the resulting liquids can be treated separately or combined with the first obtained protein containing solution. In this way, the ultimate yield of protein is increased somewhat although the major amount of the protein is normally obtained in the initial extraction step.

The keratin proten is then conventionally precipitated from the protein containing solution by lowering the pH to the isoelectric point of the protein. The pH can be lowered by the addition of acid in the known manner. Any of a variety of inorganic or organic acids can be used. Representative acids are hydrochloric acid, sulfuric acid, acetic acid, phosphoric acid and the like. The acid is used in an amount sufficient to lower the pH of the protein containing solution to the isoelectric point or below of the protein. Preferably, the pH is reduced to below about 4.5 and the range of 3.0 to 4.5 is especially suitable.

The precipitated protein is separated from the protein barren liquid by conventional techniques—i.e. decantation, filtration and the like. The resulting curd can then be treated in accordance with the present invention or the protein can first be dried if desired by any conventional drying technique—i.e. spray, drum, tray, freeze or the like.

A particularly desirable starting keratin protein is one which has been prepared in the above manner but in addition has been treated with an alkali metal sulfite after extraction and prior to being precipitated. It is theorized that the sulfite yields controlled amounts of sulfur dioxide and thence sulfurous acid and that the thus formed sulfurous acid reacts with hydrogen sulfide and any free sulfur formed during the sodium sulfide solubilization or subsequent precipitation of the keratin protein. The products resulting from this reaction are thought to be water soluble compounds such as $H_2S_2O_3$, $H_2S_3O_6$ and/or $H_2S_4O_6$. These compounds are not volatile and do not precipitate with the protein.

Representative sulfides are sodium and potassium sulfite and bisulfite. A preferred treating agent is sodium sulfite ($Na_2SO_3$). The alkali metal bisulfites, such as sodium bisulfite ($NaHSO_3$), are less preferred since they release sulfur dioxide at a faster rate and thus may cause some pre-mature localized precipitation unless added at a slower rate than the sodium sulfite. The sulfite is used in a molar excess in relation to the amount of alkali metal sulfide used in the initial extraction step. Preferably the molar ratio of the sulfite to the sulfide is in the range of 1.01–10.0:1.0. The sulfite in dry form or in the form of an aqueous solution thereof is simply added to the protein containing solution in the designated amount. The protein containing solution can be stirred during or after the addition to effect a more uniform distribution of the sulfite therein. The keratin protein obtained using this preferred procedure has improved properties, particularly odor, flavor and color.

The keratin protein as above prepared is then solubilized in a dilute aqueous alkali metal hydroxide solution and subsequently neutralized with hydrogen peroxide according to the present invention. Representative alkali metal hydroxides are sodium and potassium hydroxide. Thus the protein is dispersed at less than about 15% by weight solids in the dilute alkali metal hydroxide solution. Dispersions above about 15% solids are very viscous and difficult to handle because of their lack of fluidity. Preferably, the protein is dispersed in an amount of about 1 to 10% by weight solids based on the weight of the dispersing medium. The preferred alkali metal hydroxide is sodium hydroxide. The alkali metal hydroxide is present in an amount sufficient to yield a solution or colloidal dispersion having a pH of a least 8 and preferably less than about 11.5. The lower pH solutions are suitable when the protein is present in low solids concentration. Preferably the pH of the alkali metal hydroxide-protein solution is in the range of 8.5 to 11.0 prior to the treatment thereof with the oxidizing agent. Moderate heat aids in the solubilization of the protein in the aqueous alkali metal hydroxide solution. Thus the mixture of the protein and solution is preferably heated to about 50 to 100° C.

The pH of the alkaline solution is then lowered by the addition of the water soluble oxidizing agent. The oxidizing agent may be added to the alkaline solution at various temperatures. Room temperature is entirely suitable. However, the oxidizing agent can be added at lower or higher temepratures—i.e. at 50 to 100° C. when the alkali metal hydroxide-keratin mixture is heated to such temperatures to aid in the solubilization of the protein. Where the pH of the alkaline solution is quite high, such as above 11.5, it can be partially reduced by the addition of an acid prior to the treatment with the oxidizing agent. Some precipitate may be formed in such partial neutralization but the same is solubilized rather readily during the treatment with the oxidizing agent.

Any of a variety of relatively strong, water soluble oxidizing agents can be used. Representative oxidizing agents are hydrogen peroxide, peracetic acid, performic acid, sodium periodate, sodium chlorite and the like. The preferred oxidizing agent is hydrogen peroxide which is commercially available at various strengths—3%, 6%, 27.5%, 30%, 35%, 50%, 70% and 90% by weight aqueous solutions. It is preferred to use 27.5 to 70% by weight aqueous solutions of the hydrogen peroxide. It is also preferred to use reasonably dilute aqueous solutions of some of the other oxidizing agents such as peracetic acid. In this way localized precipitation is substantially completely avoided. The oxidizing agent can be added in increments or all at once. Surprisingly, addition of the preferred hydrogen peroxide in one step lowers the pH somewhat more than if increments of the same total amount are used. Sufficient oxidizing agent is added to reduce the pH of the protein solution to less than 8.0 but not lower than about 6.0. Preferably, the pH is reduced to about 6.5 to 7.5 and even more preferably to the neutral point—pH 7.0. As indicated previously, it is believed that the oxidizing agent oxidizes cystine and/or cysteine to cysteic acid. Thus the oxidizing agent is one of sufficient strength to carry out such oxidation.

The substantially neutral, improved keratin protein product can be used as such or it can be dried to yield a water soluble powder. Any conventional drying technique can be used—i.e. spray, drum, tray, freeze and the like.

The invention is further illustrated by the following specific description.

EXAMPLE I (a) Preparation of starting keratin protein

Two hundred grams of white chicken feathers were added to 2666 ml. of 0.1 molar sodium sulfide and the resulting slurry was held at 40° C. for two hours. It was then centrifuged to yield 1960 ml. supernatant liquid. The insoluble residue was washed with 1960 ml. water and the resulting slurry was again centrifuged to yield 1960 ml. supernatant liquid. The insoluble residue was washed a second time with 1960 ml. water and 1960 ml. supernatant liquid was recovered. The insoluble residue was discarded and the three supernatant liquids were combined. Sodium sulfite (100.5 g.) was added to the combined supernatant liquids and the pH was adjusted to 4.2 by adding 1 N hydrochloric acid. The resulting precipitated protein was washed twice with five liters of water and then was freeze dried. There was obtained 131.7 grams of keratin protein.

(b) Preparation of improved keratin protein product

One hundred grams of the keratin protein as prepared in (a) above was slurried with 900 ml. 0.1 N sodium hydroxide at room temperature. The slurry thickened and formed a stiff gel. The gel was slowly heated to 80° C. and dissolved to form a viscous protein solution. The resulting solution, having a pH of 10–11, was cooled to room temperature (25° C.) and then 15 ml. of 30% hydrogen peroxide was added. The pH decreased to 6.7 and no protein precipitated. The keratin protein product was drum dried under 40 lbs. steam pressure to yield a nearly white, bland, odorfree, powder which was cold water soluble. A relatively stable foam was prepared by adding the keratin protein product to water at a 2% concentration and whipping the resulting solution at high speed on a home mixer for three minutes.

EXAMPLE II

To 134.4 ml. water was added 13.2 g. keratin protein product as prepared in Example I(b) above, 300 g. sugar, 12 g. corn syrup and 1 g. cream of tartar. This mixture was whipped in a double boiler for 5 minutes to produce a whipped icing. Five ml. vanilla was added and the icing was spread on a white layer cake. The icing was very satisfactory in volume, stability and flavor.

EXAMPLE III

Three 10% by weight solids dispersions of keratin protein as produced in Example I(a) above were prepared (100 g. protein dispersed in 900 ml. 0.125 N NaOH). The dispersions were heated to 80° C. to aid in the solubilization of the protein and then cooled to room temperature. The solutions had a pH of about 10.5. The first solution was neutralized by adding 30% $H_2O_2$ in 5 ml. increments.

The first 5 ml. $H_2O_2$ lowered the pH to 10.3 and the second to 8.0. The third, fourth and fifth increments lowered the pH successively to 7.6 and upon standing overnight the pH dropped to 7.2. The second solution was treated directly with 20 ml. of the 30% $H_2O_2$ solution. The pH was reduced to 6.5. The third solution was treated directly with 15 ml. of the 30% $H_2O_2$ solution. The pH was reduced to 6.7. No protein precipitated in any of the treated solutions. The three keratin protein product solutions were combined and drum dried at 40 lbs. steam pressure to yield a product having the same fine properties as the product of Example I(b).

EXAMPLES IV-VI

Three 10% by weight solids dispersions of keratin protein as produced in Example I(a) above were prepared (5 g. protein dispersed in 45 ml. 0.1 N NaOH). The dispersions were heated to 80° C. to aid in the solubilization of the protein and then cooled to room temperature. The solutions had a pH of 10.0-10.5. The first solution (Example IV) was treated with a 4% by weight aqueous solution of peracetic acid. One milliliter reduced the pH to 7.8 and the addition of 5 more drops reduced the pH to 6.8. The second solution (Example V) was treated with potassium periodate. The addition of two grams of the periodate reduced the pH to 6.6. The third solution (Example VI) was treated with sodium chlorite. One gram of the chlorite reduced the pH to 6.0. In these examples there was no significant protein precipitation and the resulting solutions had essentially the same fine properties as the solution and product of Example I(b).

From the above description, it will be apparent that some modifications and variations of the invention and improvement as hereintofore set forth may be made without departing from the spirit and scope thereof.

The embodiments of the invention in which an exclusive property or privilege is claimed are defined as follows:

1. A process for producing a keratin protein product comprising solubilizing about 1 to 15% by weight alkali metal sulfide extracted and acid precipitated keratin protein in an aqueous alkali metal hydroxide solution at a pH of 8.0 to about 11.5 and adding a sufficient amount of a water soluble strong oxidizing agent to the resulting solution to reduce the pH thereof to less than 8.0 but not lower than about 6.0.

2. The process of claim 1 wherein the sodium sulfide extracted and precipitated protein is derived from chicken feathers and the pH of the alkali metal hydroxide solution thereof is 8.5 to 11.0.

3. The process of claim 1 wherein the oxidizing agent is hydrogen peroxide.

4. The process of claim 3 wherein the hydrogen peroxide is added in the form of an aqueous solution thereof.

5. The process of claim 4 wherein the hydrogen peroxide is added in increments.

6. The process of claim 1 wherein the pH of the keratin protein solution is reduced to about 6.5 to 7.5.

7. The process of claim 1 wherein the solution having a pH of about 6.0 to 8.0 is dried to produce a dried keratin protein product.

8. The process of claim 1 wherein the alkali metal hydroxide is sodium hydroxide.

9. The process of claim 1 wherein the alkali metal sulfide extracted and precipitated keratin protein is prepared by extracting a naturally occurring keratin source material with an aqueous solution of alkali metal sulfide, the resulting protein solution is treated with a treating agent selected from the group consisting of metal sulfites and bisulfites in an amount such that the number of moles thereof exceeds the number of moles of alkali metal sulfide used in the extraciton of the source material and then the keratin protein is precipitated by adding an acid in an amount sufficient to lower the pH of the solution to less than about 4.5.

10. The process of claim 9 wherein the naturally occurring keratin source material is chicken feathers, the alkali metal hydroxide is sodium hydroxide, the alkali metal sulfide is sodium sulfide, the treating agent is sodium sulfite, the keratin protein is solubilized in amount of about 1 to 10% by weight in the aqueous sodium hydroxide solution, the oxidizing agent is hydrogen peroxide, the hydrogen peroxide is added as a 30% by weight aqueous solution and all of the said hydrogen peroxide solution is added to the keratin protein containing solution at once.

11. The keratin protein product solution prepared by the process of claim 1.

12. The dried keratin protein product prepared by the process of claim 7.

References Cited

UNITED STATES PATENTS

| | | | |
|---|---|---|---|
| 2,180,262 | 11/1939 | Sturm et al. | 260—113 |
| 2,201,929 | 5/1940 | Speakman | 132—7 |
| 2,261,094 | 10/1941 | Speakman | 132—7 |
| 2,287,028 | 6/1942 | Ambrosio et al. | 106—158 |
| 2,351,718 | 6/1944 | Speakman | 132—7 |
| 2,399,161 | 4/1946 | Brother et al. | 106—155 |
| 2,535,684 | 12/1950 | Koerner | 260—123.7 |
| 2,591,945 | 41/1952 | Koerner et al. | 260—123.7 |
| 2,667,475 | 1/1954 | Fick | 260—123.7 |
| 3,308,113 | 3/1967 | Johnsen et al. | 260—118 |

FOREIGN PATENTS

| | | |
|---|---|---|
| 531,446 | 1/1941 | Great Britain. |
| 609,047 | 9/1948 | Great Britain. |
| 479,053 | 12/1951 | Canada. |

OTHER REFERENCES

Journal of the Society of Chemical Industry, 1931, pp. 1-7, Speakman.

Journal of the Textile Institute, 1941, pp. 83, 93–96, 98, and 102–107, Speakman.

Chemistry and Reactivity of Collagen, Gustavson, 1956, pp. 279–281.

WILLIAM H. SHORT, Primary Examiner

HOWARD SCHAIN, Assistant Examiner

U.S. Cl. X.R.

99—139; 260—123.7